United States Patent [19]
Coteus et al.

[11] Patent Number: 5,953,515
[45] Date of Patent: Sep. 14, 1999

[54] PLUGGABLE ELECTRONIC CARD PRESENCE DETECT SCHEME FOR USE IN PARALLEL AND SERIAL VITAL DETECT PRODUCT DATA (VPD) COLLECTION SYSTEMS

[75] Inventors: Paul William Coteus, Yorktown Heights, N.Y.; Mark William Kellogg, Essex Junction, Vt.; Robert Dominick Mirabella, Round Rock; Wally Tuten, Georgetown, both of Tex.

[73] Assignee: International Business Machines Corporation, Armonk, N.Y.

[21] Appl. No.: 08/837,180

[22] Filed: Apr. 11, 1997

[51] Int. Cl.$^6$ ................................ G06F 15/00
[52] U.S. Cl. ........................................ 395/500
[58] Field of Search ............................ 395/500, 309

[56] References Cited

U.S. PATENT DOCUMENTS

| | | |
|---|---|---|
| 4,730,251 | 3/1988 | Aakre et al. . |
| 4,888,773 | 12/1989 | Arlington et al. . |
| 5,253,357 | 10/1993 | Allen et al. . |
| 5,339,402 | 8/1994 | Ueda ........................................ 395/425 |
| 5,408,229 | 4/1995 | Yabusaki et al. ..................... 340/825.5 |
| 5,428,762 | 6/1995 | Curran et al. ............................ 395/425 |
| 5,530,895 | 6/1996 | Enstrom ................................. 395/829 |
| 5,539,912 | 7/1996 | Clarke, Jr. et al. ..................... 395/825 |

Primary Examiner—Kevin J. Teska
Assistant Examiner—Ayni Mohamed
Attorney, Agent, or Firm—Volel Emile; David H. Judson

[57] ABSTRACT

A vital product data (VPD) detection circuit mountable on a substrate of a pluggable component. The circuit comprises a "parallel read" circuit for generating vital product data associated with the pluggable component, a "serial read" circuit for storing and retrieving vital product data associated with the pluggable component, and means for interconnecting the parallel and serial read circuits. The parallel read circuit preferably comprises a parallel array of transistors surface-mounted on the substrate, and the serial read circuit preferably comprises a serial EEPROM having a clock input, a set of address inputs, and a bidirectional data pin. A VPD detection mechanism may disable the parallel VPD circuitry in favor of the serial VPD detection circuitry, or vice versa, or these circuits may be enabled but activated in a mutually exclusive manner.

15 Claims, 9 Drawing Sheets

PLUGGABLE ELECTRONIC CARD PRESENCE DETECT SCHEME FOR USE IN PARALLEL AND SERIAL VITAL DETECT PRODUCT DATA (VPD) COLLECTION SYSTEMS

BACKGROUND OF THE INVENTION

1. Technical Field

The present invention generally relates to computer systems and, in particular, to techniques for identifying the characteristics of pluggable computer components.

2. Description of the Related Art

A typical computer is highly modular. During a computer's useful life, one or more components are replaced either due to maintenance or system upgrades. To this end, most computer components are now designed to be "field replaceable."

The process of identifying the characteristics of field replaceable or so-called "pluggable" computer components, such as memory cards, is a long-standing problem in the computer industry. Such characteristics may include, without limitation, such information as where the card was built, the name of the manufacturer, what type of devices reside on the card, their operating characteristics, and so forth. Thus, for example, when a pluggable is first installed in a system, this so-called "vital product data" (VPD) is read (e.g., on power on) by a VPD detection mechanism to identify and catalog the new system component.

Vital product data detection systems handle this identification task typically by employing either a parallel or serial read approach. In the parallel approach, a predetermined set of so-called "physical descriptor" (PD) pins or contacts at the edge of the pluggable card were assigned to be either open (high impedance) or ground, thus forming a "code" to be read by a control chip. The result was a large number of signal pins on a memory controller dedicated to a single function, namely, to determine if a particular PD bit was '0' (grounded on the memory card) or '1' (connected to high voltage (Vcc) via a resistor on the system board). It is also known to have multiple pluggable component devices share the same PD bus and be separately enabled using a buffering technique.

In the serial read approach, a memory device, such as a serial-controlled ROM is used to store the vital product data. A well-known technique uses a National Semiconductor NM34C02 EEPROM to store up to 2048 bits of information. Data transfer between the memory controller to the serial ROM is accomplished through the use of a clock and serial data pin.

These prior art VPD approaches have several problems. One problem with the parallel read technique (i.e. enable PD) is that the buffer is too large to fit on many types of pluggable components, for example, the next generation of DIMM modules that are already fully-loaded with memory devices. More problematic, systems that use one method of VPD collection, e.g., enabled PD with a buffer, are incompatible with systems that use a serial approach. As a result, in the prior art, component design was tailored to the VPD scheme being used.

The present invention addresses these problems.

SUMMARY OF THE INVENTION

It is thus a primary object of the invention to identify the characteristics of field replaceable or so-called "pluggable" computer components.

It is another primary object of the invention to detect vital product data from a pluggable computer component.

Another principle object of the invention is to integrate an enabled parallel PD bit scheme with a serial ROM device on a pluggable component to provide VPD detection.

It is yet another object of the invention to combine parallel and serial read VPD detection schemes on a single pluggable component.

Still another important object is to provide a single common pluggable component design for use in either parallel or serial VPD collection systems or even in systems that employ both techniques.

Yet another more general object is to enhance known presence detect schemes for computer field replaceable units.

Another object is to provide a unique, flexible and cost-effective solution for pluggable component design that is useful in either of the industry standard VPD collection schemes employed in today's computer systems.

These and other objects of the invention are achieved in a vital product data (VPD) detection circuit mountable on a substrate of a pluggable component. The circuit comprises a "parallel read" circuit for generating vital product data associated with the pluggable component, a "serial communication" circuit for storing and retrieving vital product data associated with the pluggable component, and means for interconnecting the parallel and serial circuits. The parallel read circuit preferably comprises a parallel array of transistors surface-mounted on the substrate, and the serial read circuit preferably comprises an EEPROM having a clock input, a set of address inputs, and a bidirectional data pin. The interconnecting means includes a set of conductors connecting a given subset of the parallel array of transistors to the address inputs of the EEPROM, and a separate conductor connecting one of the parallel array of transistors to the data pin of the EEPROM.

In accordance with another aspect of the invention, a pluggable component for use in a computer having a vital product data (VPD) detection mechanism comprises a substrate for supporting electrical components, parallel VPD detection circuitry mounted on the substrate, and serial VPD detection circuitry mounted on the substrate. Control circuitry of the VPD detection mechanism disables the parallel VPD circuitry in favor of the serial VPD detection circuitry, or vice versa, or both these circuits may be present but activated in a mutually-exclusive manner.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

The present invention is implemented in a computer. By way of example only, the computer is an IBM RISC System/6000 computer (a reduced instruction set of so-called RISC-based workstation) running the AIX (Advanced Interactive Executive Version 4.1 and above), or an Intel-based processor system running the Windows NT, Windows '95 or OS/2® operating system.

Figure 1:
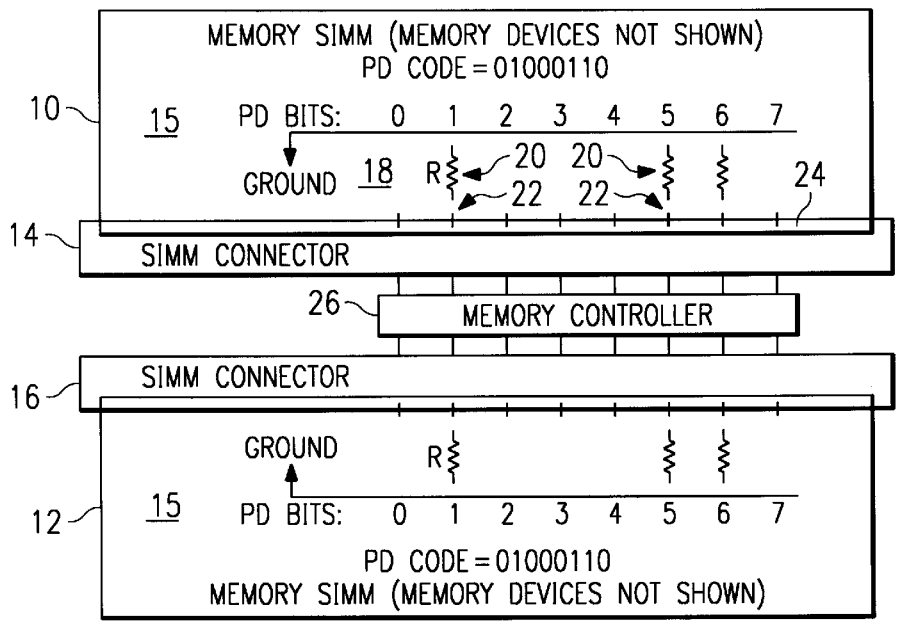
FIG. 1 is a schematic diagram of a known technique for identifying the characteristics of pluggable computer components by reading physical descriptor (PD) pins.

FIGS. 1–2 and 6–7 illustrate known prior art techniques but are provided here by way of brief background. FIG. 1 illustrates a pair of single in-line memory modules (SIMMs) 10 and 12 "pluggable" into connectors 14 and 16, respectively. Each of the components includes a substrate 15 on which electrical components (i.e. memory devices, not shown) are supported in a known manner. Although the present invention is described in the context of memory devices as the pluggable component, it should be appreciated that this is not a limitation of the invention. Indeed, the techniques described below are useful for collecting vital product or other data from any type of pluggable or field-replaceable computer component device irrespective of its use, configuration or circuitry.

As seen in FIG. 1, a "parallel" VPD detection circuit 18 is formed on the substrate using a set of resistors 20 connected to a predetermined set of pins or contacts 22 at the edge 24 of each card. The set of pins (known as "physical descriptors") are either open (high impedance) or ground, thereby forming a code to be read by a control chip in the memory controller 26. In FIG. 1, the PD code is 10111001, which is merely representative. This code is associated with some vital product data identifying the device and/or its characteristics.

Figure 2:
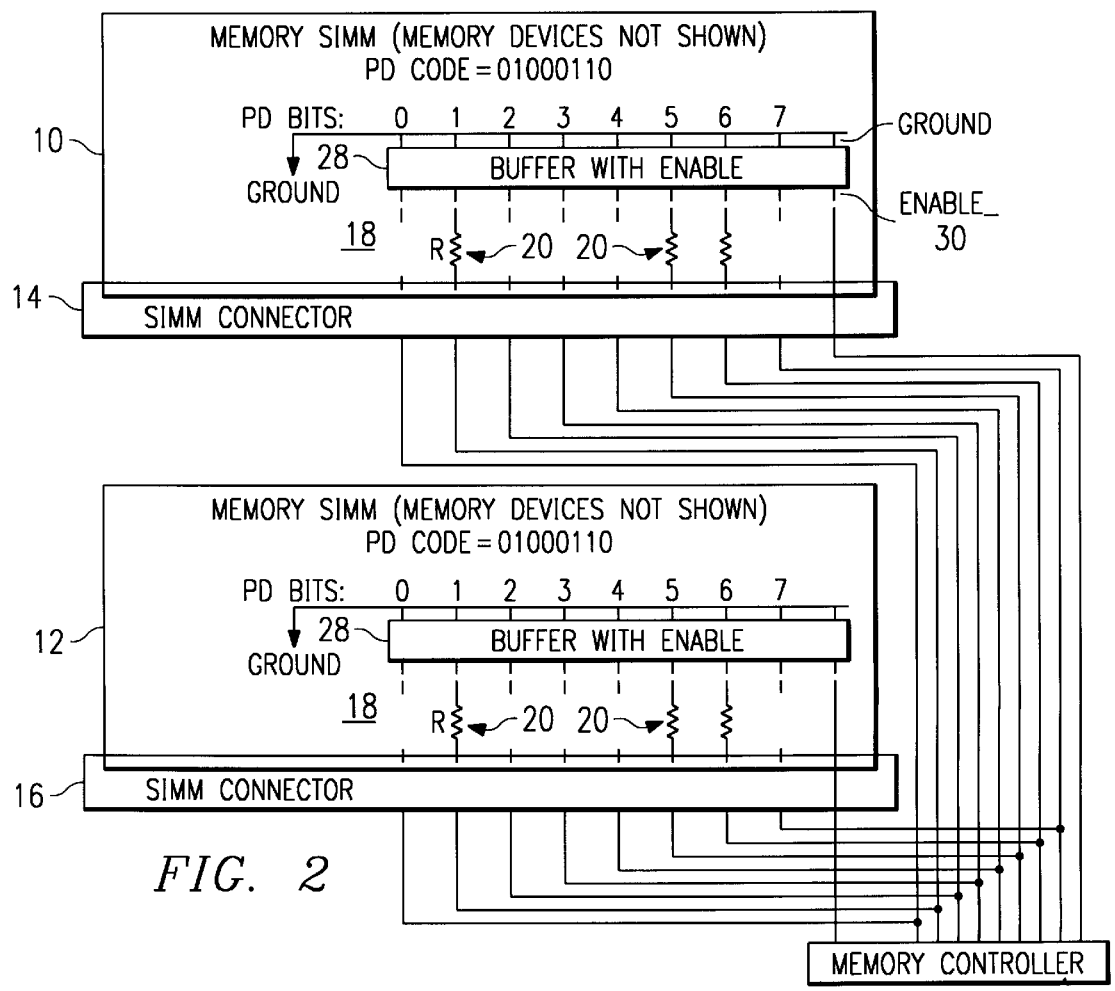
FIG. 2 is a schematic diagram of a variation of the technique shown in FIG. 1 wherein the characteristics of a number of pluggable components are identified using an enable PD bit scheme.

FIG. 2 shows an alternative approach that enabled the SIMMs 10 and 12 to share the same PD bus. In this approach, each PD detection circuit 18 includes an associated buffer 28 having an enable input 30. When the enable signal is driven high (e.g., =Vcc), then all PD bits (associated with the resistors 20) are in a high impedance state. When the enabled signal (Pdenb_) is low (e.g., ground), the PD bits take on the desired code. This approach is known as "enabled parallel PD" detection because both pluggable devices shared the same PD bus but are separately enabled.

Figure 3:
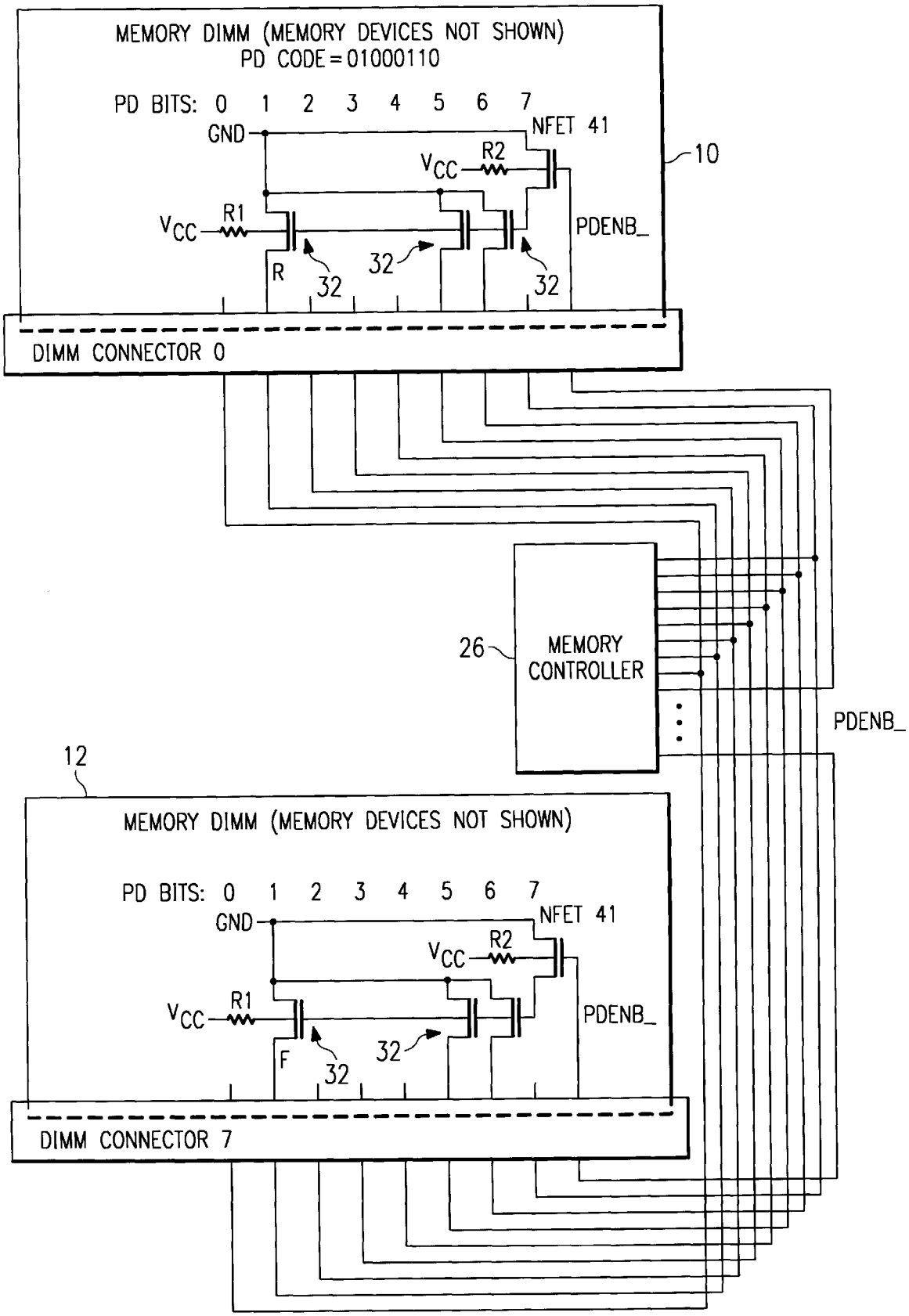
FIG. 3 is a schematic diagram of another enabled PD bit scheme using NFET devices.

FIG. 3 illustrates an improved technique of the present invention for creating the enabled parallel PD function shown in FIG. 2. Instead of using discrete resistors and buffers, the PD code is formed using an array of surface mount NFET semiconductor devices 32. In this arrangement, the enable signal (PDenb_) is used to switch the gate of the respective FET and create a temporary path to ground. The arrangement of contacts and function on the DIMM's is the same for FIGS. 2 and 3, however, the circuit of FIG. 3 does not require a buffer. An extra NFET device 41, which is an inverter, is necessary to make the enable signal low active. NFET 41 is always conducting, and thus resistor R1 is drawing DC current unless the enable signal is pulled low. In this circuit, resistors R1 and R2 are chosen to allow switching of NFET's with 50 pf gate capacitance in under 5 microseconds and to keep the DC current as low as possible. Resistor R1 turns the PD NFET's on when NFET 41 turns off; resistor R2 turns NFET 41 back on if PDenb_ is not asserted.

Figure 4:
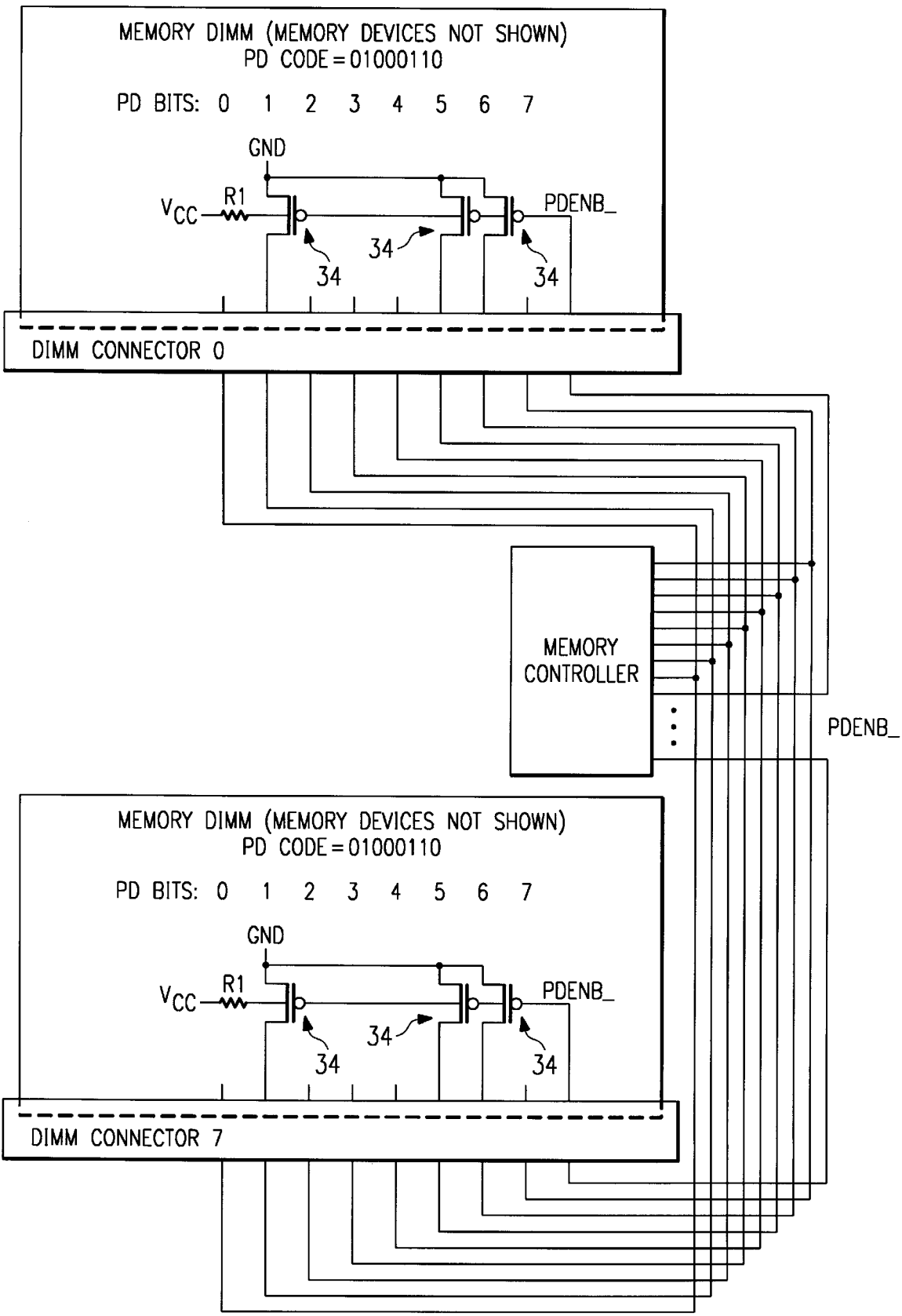
FIG. 4 is a schematic diagram of a variation of the circuit shown in FIG. 3 using PFET devices.

FIG. 4 shows an alternate embodiment of the inventive circuitry of FIG. 3 using PFET devices 34 instead of NFET devices. The circuit of FIG. 4 uses fewer devices. In this circuit, resistor R1 is used to turn the PD PFET's off when the PDenb_signal is not asserted. If PDenb_ is asserted (driven to ground), then the PD PFET's that are populated are turned on and connect their associated PD pins to ground. There is no source of DC current.

Figure 5:
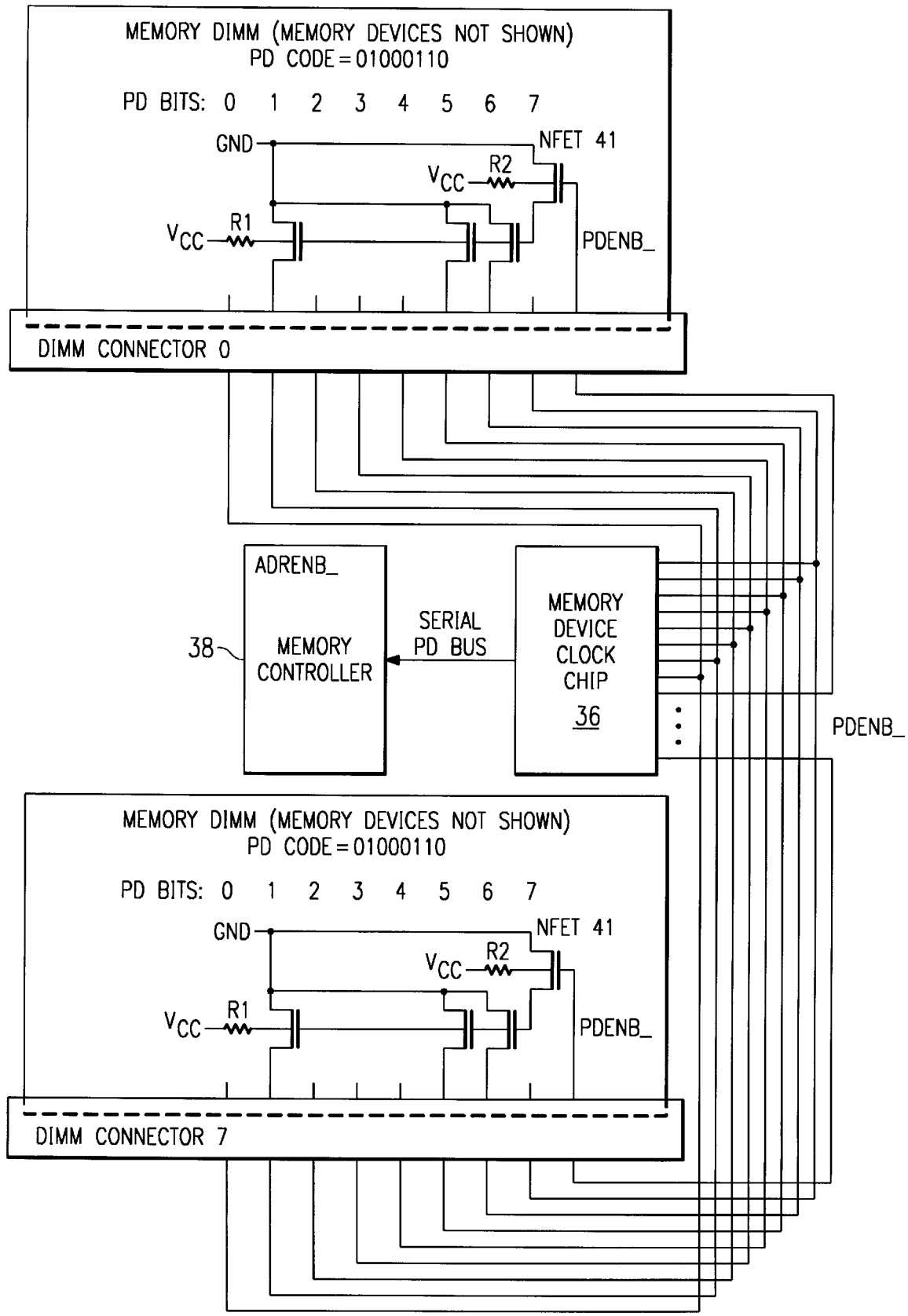
FIG. 5 is a schematic diagram of another, more preferred variation of an enabled PD bit including a parallel-to-serial interface for reading VPD from a number of components.

With reference now to FIG. 5, a central clock chip 36 may be used in the VPD detection circuitry to make the task of reading out DIMM's easier. Central clock chip 36 includes a parallel to serial interface for reading out a large number of such DIMM's (two of which are shown in FIG. 5). In operation, this chip provides a unique PDenb_signal to each DIMM. When the PDenb_ signal is asserted to the DIMM, the collection chip samples the PD bits and serializes the PD information back to the memory controller 38. The process is repeated for each DIMM in the system.

Figure 6:
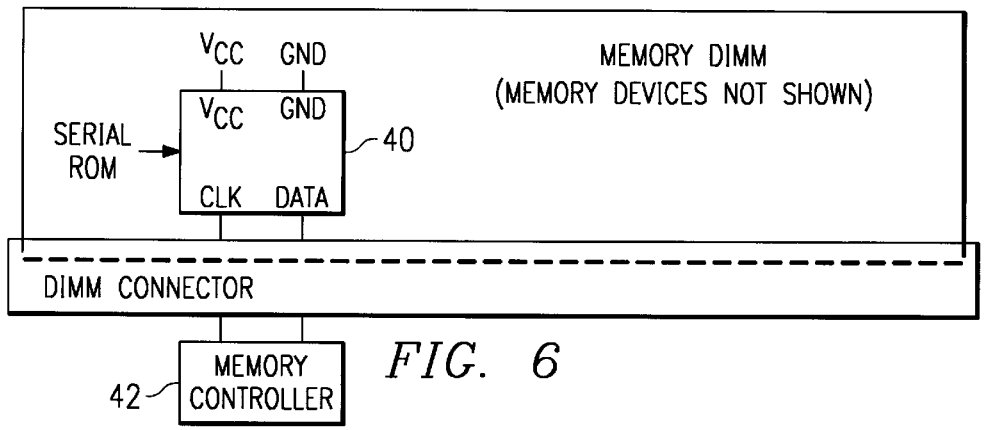
FIG. 6 is a schematic diagram of known prior art using a serial EEPROM detection scheme.
Figure 7:
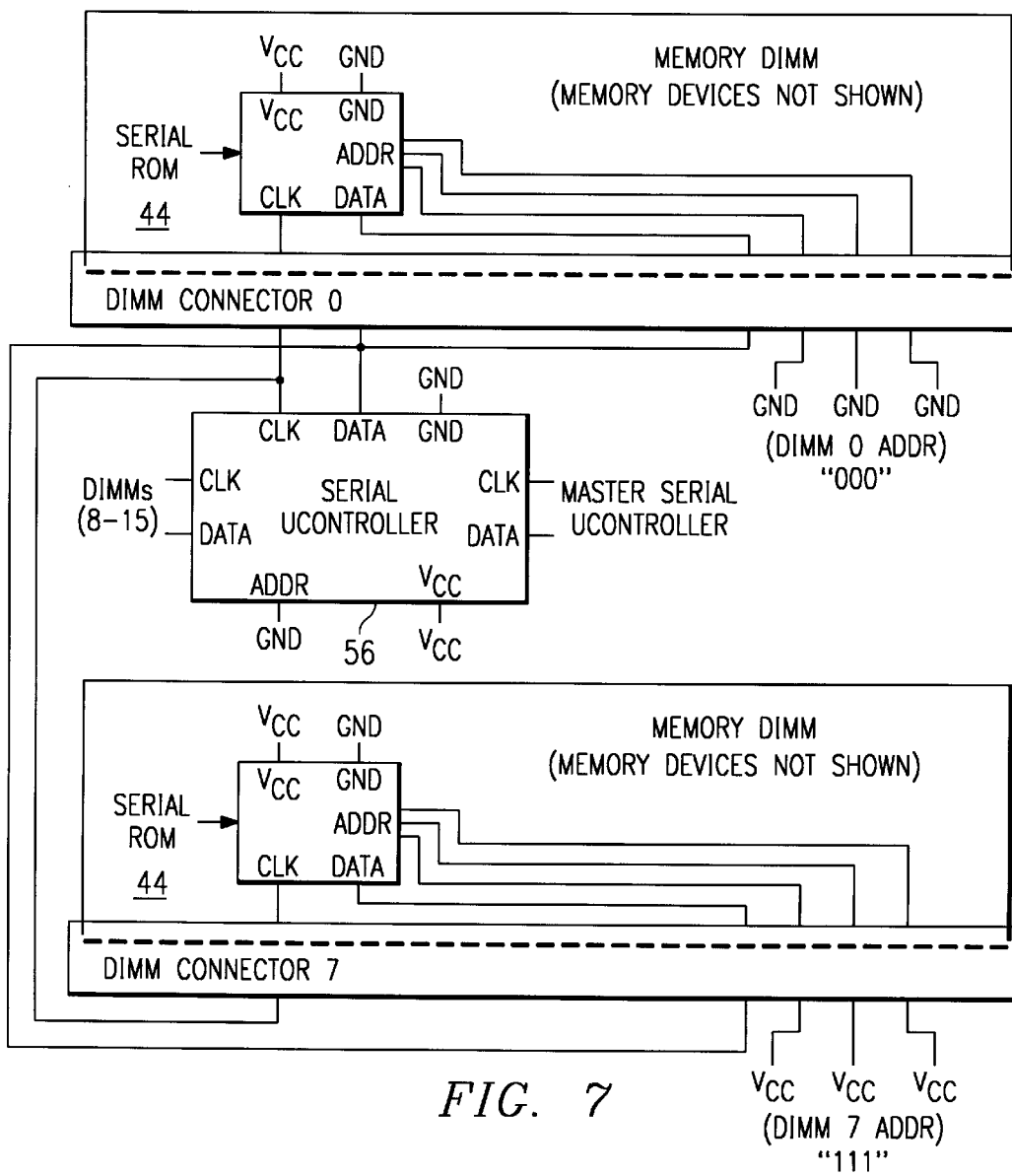
FIG. 7 is a schematic diagram of a serial EEPROM detection scheme for multiple pluggable components.

"Serial" read VPD detection circuitry is known in the art. FIG. 6 shows the basic technique wherein DIMM 10 supports a ROM chip 40 having a clock input (Clk) and a bidirectional data pin. ROM chip 40 may be a National Semiconductor NM34C02 EEPROM that stores up to 2048 bits of VPD information. Data transfer between the memory controller 42 to the serial ROM 40 is accomplished through the use of the clock and serial data pin. FIG. 7 shows how these serial devices are used for multiple pluggable components. In this embodiment, each serial ROM device 44 has 3 address bits Addr so that eight (8) independent addresses may be set, thereby allowing up to eight (8) DIMMs to be connected together with common data and clock. Each DIMM is personalized with its own address, with DIMM 0 having the address "000" and DIMM 7 having the address "111". A single chip CMOS 8-bit microcontroller 56, such as a Phillips 83C751, is then used to generate addresses that match the DIMM EEPROM address so that data can be clocked out. If more than eight (8) DIMMs are supported, a two port controller is used. In such an embodiment, the clock and data pins of DIMM's 8–15 are connected to the second clk/data port of the controller. Since each controller port is addressable, the controller is then programmed to collect the PD information from each port, thereby allowing DIMM's 0–7 and DIMM's 8–15 to use the same 3-bit DIMM addresses.

Figure 8:
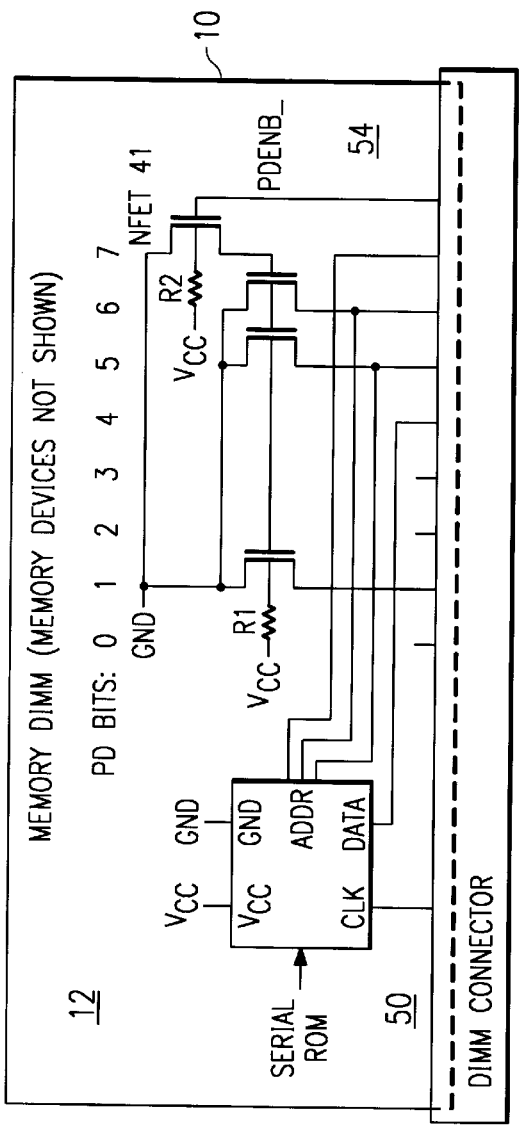
FIG. 8 is a schematic diagram of the preferred embodiment of the invention wherein an enable PD bit scheme and a serial EEPROM device are integrated.
Figure 9:
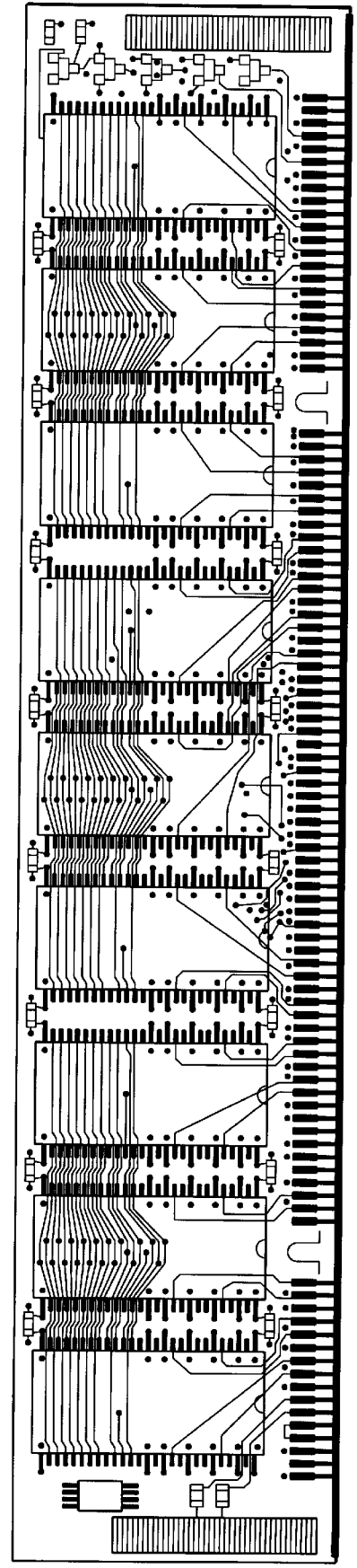
FIG. 9 is an actual layout of the invention implemented on a dual in-line memory module (DIMM)

Some vital product data detection systems use PD bits, while others use serial EEPROM's. The problem is how to support both types of systems using only one design for the pluggable component. To solve this problem, the present invention combines the function of the PD bits such as shown in FIG. 3 with the address bits of a serial EEPROM such as shown in FIG. 7 to create a pluggable component design that functions in either VPD environment. This preferred embodiment of the invention is illustrated in FIG. 8. As seen there, the pluggable component 10 has a substrate 12 on which electrical components (in this case memory devices) are supported. The pluggable component includes serial VPD detection circuitry 50, which is a serial EEPROM, and parallel VPD detection circuitry 54, which is an NFET-based array of enabled PD devices. With this inventive scheme, means are provided for interconnecting the serial and parallel VPD detection circuitry. In particular, PD bits are physically shared with the EEPROM control and data pins. PD bits 5–7 (in this example only) are used as the EEPROM 3 bit address, and PD bit 4 is shared with the serial data transfer pin on the EEPROM. As a result, the address of the EEPROM is exposed to the base memory card 10 and can be personalized using tie-ups and tie-downs. According to the preferred embodiment of the present invention, each EEPROM on each DIMM is given a different 3-bit address, thereby allowing each EEPROM to be separately addressable. The clock and data pins to the DIMM's, however, are preferably common. The clock pin for the EEPROM, however, generally cannot be shared with the PD bits; otherwise the EEPROM may attempt to drive data when the PD FET(s) switch state. FIG. 9 shows an actual DIMM layout incorporating the present invention.

The particular "bits" that are shared between the serial and parallel schemes as shown in FIG. 8 should not be taken by way of limitation. By sharing bits, the VPD detection scheme does not have to allocate any additional card edge connections to accomplish this function.

One of ordinary skill will appreciate that the present invention provides significant advantages over the prior art. In the past, systems to handle the reading of VPD information employ either a parallel or serial read approach, thus requiring the component design to be tailored to the VPD scheme being used. In the preferred embodiment, the serial read is facilitated with an EEPROM, although other programmable memory devices may be used as well. The EEPROM, although illustrated with a bidirectional pin, may have separate data in and data out pins, such as an SPI interface. Likewise, the parallel read is facilitated with an array of NFET devices, although PFETs (or discrete buffer) may be used. The circuit of FIG. 8 permits a single common pluggable component design to be used in either parallel or serial VPD collection system or in systems that may now employ both. These advantages of the present invention can now be seen with reference to FIGS. 10–12.

Figure 10:
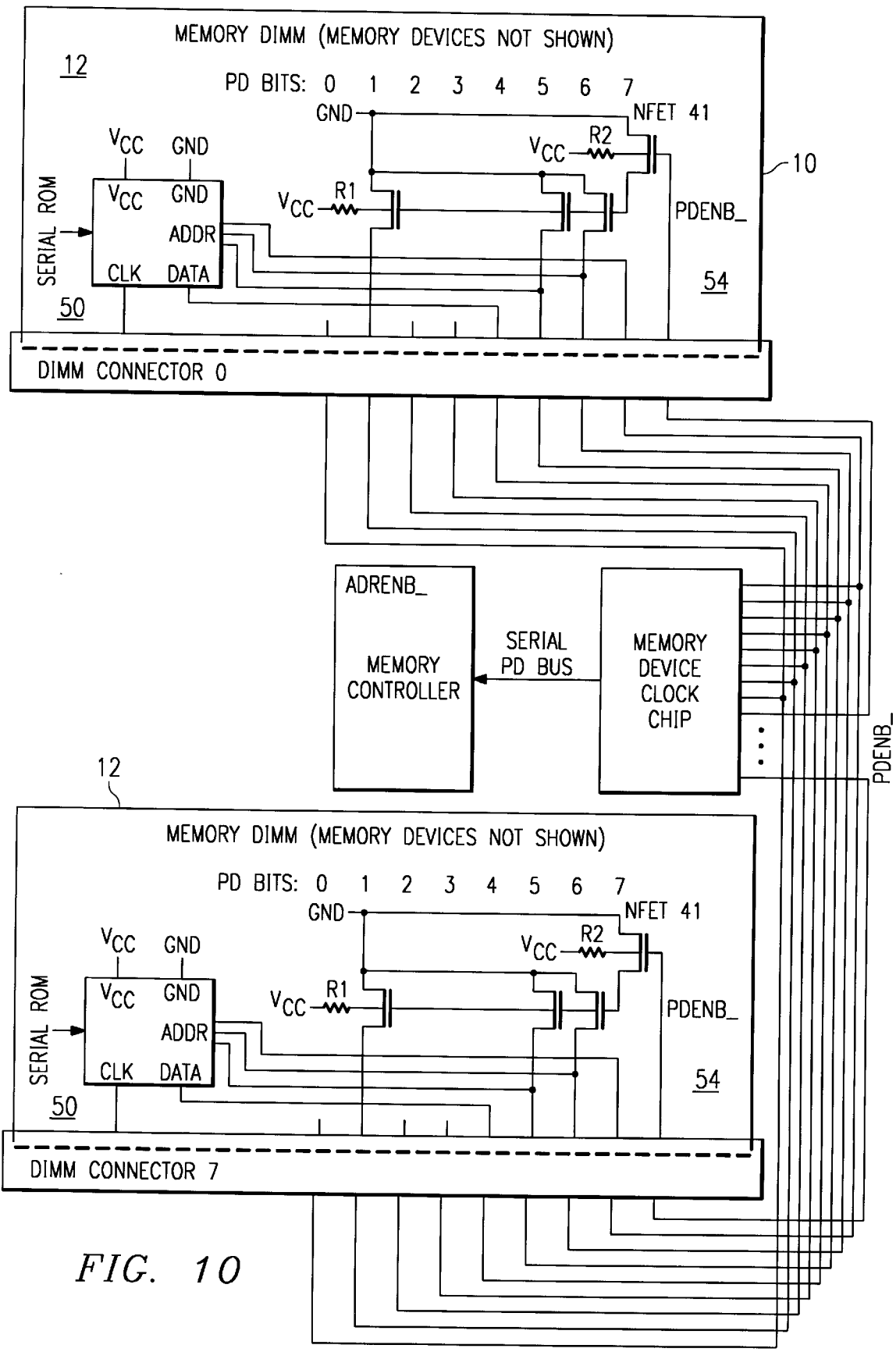
FIG. 10 illustrates how the combined function pluggable component of FIG. 8 is used in a system that utilizes a parallel VPD collection mechanism.

FIG. 10 illustrates how the combined function pluggable component is used in a system that utilizes a parallel VPD collection mechanism. The VPD collection mechanism is a known system technique carried out under the control of the operating system. As seen in this figure, each of the DIMMs 10 and 12 includes the integrated serial/parallel read circuitry 50 and 54 of the present invention described above with respect to FIG. 8. The PD collection scheme operates the same way as described in FIG. 3. The EEPROM 50 is electrically isolated from the system (thus disabling the serial read function) by tying its clock pin to an inactive state (ground). This tristates the EEPROM address and data pins, thereby allowing the PD FET's to operate as controlled by the PD enable (Pdenb_) pin.

Figure 11:
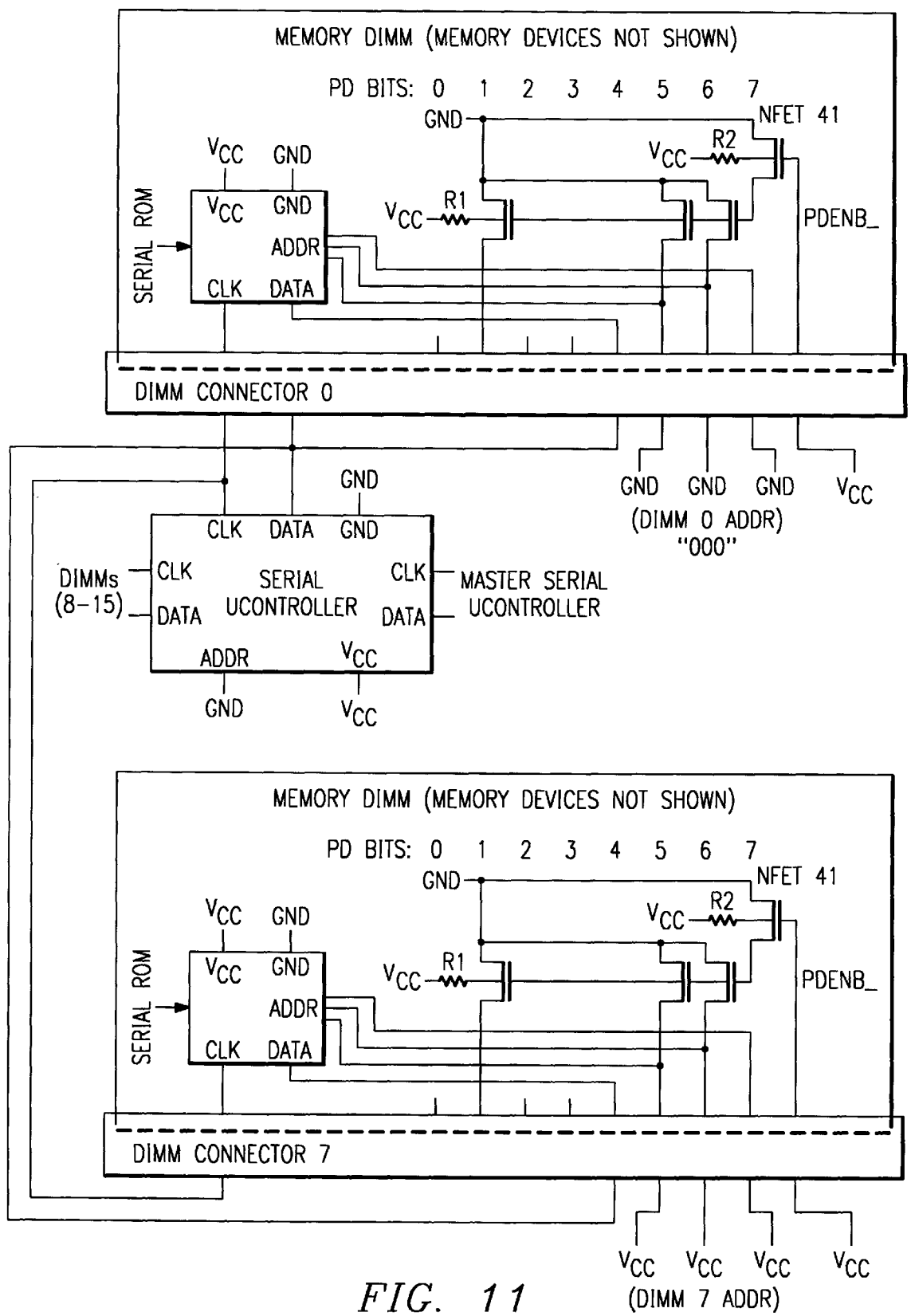
FIG. 11 illustrates how the combined function pluggable component of FIG. 8 is used in a system that utilizes a serial VPD collection scheme.

FIG. 11 shows the combined function pluggable component used in a serial VPD collection system. The serial VPD collection mechanism operates the same way as described above in FIG. 7. Here, the PD bits are electrically-isolated from the system (thus disabling the parallel read) by tying the PD enable control pins to the power supply Vcc. The PD FET drains are then forced to a high impedance state allowing the 3 bit device address, which is generated on the base card, to be presented to the EEPROM. With the PD bits disabled, the EEPROM receives and drives the serial data bus.

Figure 12:
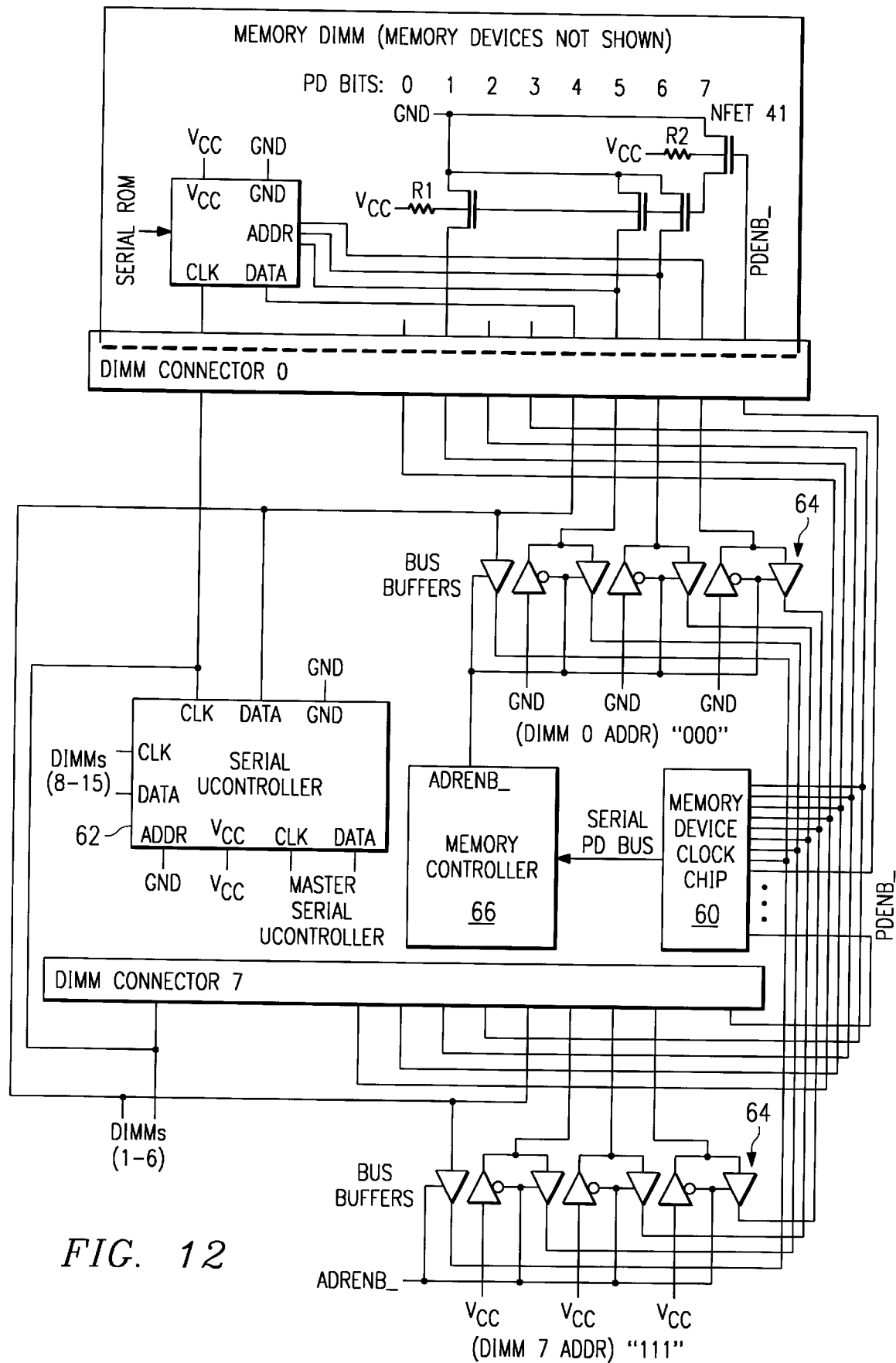
FIG. 12 illustrates how the combined function pluggable component of FIG. 8 is used in a system that utilizes both serial and parallel VPD collection.

In FIG. 10, the serial read circuitry is disabled. In FIG. 11, the parallel read circuitry is disabled. FIG. 12 illustrates how the combined function pluggable component is used in a system that employs both serial and parallel VPD collection schemes (i.e. without disabling one or the other). In this embodiment, a modified clock chip 60 is used to collect PD bits from each DIMM in a parallel fashion. A serial microcontroller 62 is used to collect PD information from each DIMM serially. Standard bus buffers 64 are used to control the flow of serial/parallel DIMM PD data as well as DIMM addresses. The memory controller 66 provides an address enable signal (ADRenb_) to control the bus buffers 64.

In operation, when the memory controller 66 asserts ADRenb_low, the low-active output-enabled bus buffers 64 present a unique slot address to each DIMM. During this period, serial communication can take place between the EEPROM's on the DIMM's and the microcontroller 62. Serial PD can be read out of the DIMM over the PD bit(4) pin. When the memory controller 66 asserts ADRenb_high, the high-active output-enabled buffers deliver the parallel DIMM PD bits to the clock chip 60. The clock chip 60 reads the PD bits from each DIMM using the PDenb_control signals as previously described. The PD information is then serialized back to the memory controller 66. The system design ensures that the serial and parallel PD collection events do not occur at the same time. Thus, in the preferred embodiment, the ADRenb_signal is mutually exclusive with the PDenb_signal to guarantee that only one device on a bussed net is driving at any given time.

Thus, according to the present invention, a single pluggable component design is provided where (in the preferred embodiment) PD FET's are combined or "integrated" with a serial readout device on the same FRU. This integration of an enabled PD bit scheme with a serial EEPROM device provides a unique, flexible and cost-effective solution for a pluggable component design that is useful in either of the industry standard VPD collection schemes employed in today's computer systems. Accompanied with the requisite base card logic support, this pluggable component design functions in either a parallel or serial VPD collection system or systems that employ both.

Although the invention has been particularly shown and described with reference to a preferred embodiment, it will be understood by those skilled in the art that various changes in form and detail may be made therein without departing from the spirit and scope of the invention.

What is claimed is:

1. An electronic module designed for connection to a electronic system comprising:
    a plurality of input/output terminals, said input/output terminals being adapted for connection to circuitry external to said electronic module;
    a plurality of bias current devices each bias current device including a field effect transistor having a first current handling terminal connected to a reference potential, a second current handling terminal serving as a second terminal and a control terminal connected to a control signal for selectively turning on and off said field effect transistor;

a data code indicating the electrical characteristics of said electronic module, said data code being provided by selectively connecting ones of said second terminals of said bias current devices to selected ones of said input/output terminals; and a nonvolatile memory device on said electronic module having a plurality of address terminals connected to selected ones of said input/output terminals, and a data output port providing a serial data output stream in response to a clock signal, said data output port being connected to another one of said input/output terminals.

2. An electronic module as in claim 1 wherein said electronic module is a dual in-line memory module.

3. An electronic module as in claim 1 wherein said module is formed on a single substrate.

4. An electronic module as in claim 3 wherein said substrate comprises a printed circuit board.

5. An electronic module as in claim 1 wherein said bias current devices are switchable.

6. An electronic module as in claim 1 wherein said field effect transistor is a P-type field effect transistor.

7. An electronic module as in claim 1 wherein said field effect transistor is a N-type field effect transistor.

8. An electronic module as in claim 1 wherein said electronic module includes a plurality of dynamic random access memories.

9. An electronic module as in claim 1 wherein said nonvolatile memory includes an electrically programmable read-only memory.

10. An electronic module as in claim 1 wherein said data code is also stored in said non-volatile memory.

11. An electronic circuit adapted to receive connection from an electronic module including vital product data (VPD) which may be in serial or parallel format, comprising:

a plurality of input/output terminals adapted for connection to a like number of input/output terminals on said electronic module;

means for reading data provided on said input/output terminals including biasing sources connected to each input/output terminal such that an input/output terminal in said electronic module which is connected to a reference potential will provide a logic low input to said data reading means and an input/output connected to a high impedance in said electronic module will provide a logic high input to said means for reading data;

means for selectively connecting at least a subset of said input/output terminals to an address, the connecting means including a plurality of inverters, each inverter having an enable input, said enable inputs being connected to a signal which selectively enables one inverter connected to each input/output terminal adapted to provide an address signal; and a selectively operable buffer connected between a selected one of said input/output terminals connected to a designated serial data input/output terminal on said connected device.

12. An electronic circuit as in claim 11 wherein said means for reading data comprises a memory device clock chip in conjunction with a memory controller.

13. An electronic circuit as in claim 11 wherein said electronic module is a dual in-line memory module.

14. An electronic circuit as in claim 11 further comprising a microcontroller providing a clock signal to a clock input terminal on said electronic module via one of said input/output terminals and a data input terminal connected to receive serial data from said electronic module in response to said clock signal.

15. In combination, an electronic circuit and an electronic module designed for interconnection between them, where:

the electronic module comprising:

a plurality of input/output terminals, said input/output terminals being adapted for connection to said input/output terminals of said electronic module;

a plurality of bias current devices having a first terminal connected to a referenced potential and a second terminal;

a data code indicating the electrical characteristics of said electronic module, said data code being provided by selectively connecting ones of said second terminals of said bias current devices to selected ones of said input/output terminals; and a nonvolatile memory device on said electronic module having a plurality of address terminals connected to selected ones of said input/output terminals, and a data output port providing a serial data output stream in response to a clock signal, said data output port being connected to another one of said input/output terminals; and the electronic circuit adapted to receive data from said electronic module in serial or parallel format, comprising:

a plurality of input/output terminals adapted for connection to a like number of input/output terminals on said electronic module;

means for reading data provided on said input/output terminals including biasing sources connected to each input/output terminal such that an input/output terminal in said electronic module which is connected to a reference potential will provide a logic low input to said data reading means and an input/output connected to a high impedance in said electronic module will provide a logic high input to said means for reading data;

means for selectively connecting at least a subset of said input/output terminals to an address; and a selectively operable buffer connected between a selected input/output terminal connected to a designated serial data input/output terminal on said connected device.

* * * * *